United States Patent
Hirano

(10) Patent No.: US 9,068,057 B2
(45) Date of Patent: Jun. 30, 2015

(54) CURABLE COMPOSITION, MOLDED ARTICLE OBTAINED FROM SAME AND PROCESS FOR PRODUCTION OF MOLDED ARTICLE

(71) Applicant: DAIKIN INDUSTRIES, LTD., Osaka (JP)

(72) Inventor: Seiichi Hirano, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/776,384

(22) Filed: Feb. 25, 2013

(65) Prior Publication Data

US 2013/0165594 A1 Jun. 27, 2013

Related U.S. Application Data

(63) Continuation of application No. 13/340,751, filed on Dec. 30, 2011, now abandoned, which is a continuation of application No. 11/996,917, filed as application No. PCT/JP2006/314570 on Jul. 24, 2006, now Pat. No. 8,211,964.

(30) Foreign Application Priority Data

Jul. 26, 2005 (JP) ................ 2005-215922

(51) Int. Cl.
*C08K 3/28* (2006.01)
*C08F 214/26* (2006.01)
*C08K 5/16* (2006.01)

(52) U.S. Cl.
CPC ............... *C08K 3/28* (2013.01); *C08F 214/262* (2013.01); *C08K 5/16* (2013.01)

(58) Field of Classification Search
CPC .... C08K 3/28; C08F 214/262; C08F 214/184
USPC ............................. 525/326.3, 342
See application file for complete search history.

(56) References Cited

U.S. PATENT DOCUMENTS

| | | | |
|---|---|---|---|
| 3,637,628 A | 1/1972 | Dorfman et al. | |
| 7,495,046 B2 | 2/2009 | Nishibayashi et al. | |
| 8,211,964 B2 * | 7/2012 | Hirano .......................... | 524/443 |
| 2003/0149159 A1 | 8/2003 | Higashino et al. | |
| 2003/0180503 A1 | 9/2003 | Yamato et al. | |
| 2005/0020748 A1 | 1/2005 | Morikawa et al. | |
| 2005/0070637 A1 | 3/2005 | Nishibayashi et al. | |
| 2006/0293432 A1 | 12/2006 | Hirano et al. | |

FOREIGN PATENT DOCUMENTS

| | | |
|---|---|---|
| EP | 1464676 A | 10/2004 |
| JP | 2000-259022 A | 9/2000 |
| JP | 2003-531222 A | 10/2003 |
| JP | 2004-500459 A | 1/2004 |
| TW | 200305606 | 11/2003 |
| WO | 0009569 A2 | 2/2000 |
| WO | 0159005 A2 | 8/2001 |
| WO | 0179337 A1 | 10/2001 |
| WO | 0185848 A1 | 11/2001 |
| WO | 03051987 A1 | 6/2003 |

* cited by examiner

*Primary Examiner* — Nicole M Buie-Hatcher
(74) *Attorney, Agent, or Firm* — Sughrue Mion, PLLC

(57) ABSTRACT

A curable composition including a fluorine-containing elastomer having a cyano group in its trunk chain and/or side chain and inorganic nitride particles in an amount of 0.1 to 20 parts by weight based on 100 parts by weight of the fluorine-containing elastomer, or a curable composition including a specific crosslinking agent selected from an oxazole crosslinking agent, an imidazole crosslinking agent and a thiazole crosslinking agent, a fluorine-containing elastomer having a cure site crosslinkable with the crosslinking agent and inorganic nitride particles. Also disclosed is a molded article obtained by curing the above-mentioned curable composition, and a process for production of a molded article which includes a step of primary vulcanization of the curable composition and a step of secondary vulcanization following the primary vulcanization.

2 Claims, No Drawings

CURABLE COMPOSITION, MOLDED ARTICLE OBTAINED FROM SAME AND PROCESS FOR PRODUCTION OF MOLDED ARTICLE

CROSS-REFERENCE TO RELATED APPLICATIONS

This is a Rule 53(b) Continuation of application Ser. No. 13/340,751 filed Dec. 30, 2011, which is a Rule 53(b) Continuation of application Ser. No. 11/996,917 filed Jan. 25, 2008 issued as U.S. Pat. No. 8,211,964, which is a 371 of PCT Application No. PCT/JP2006/314570 filed Jul. 24, 2006, and which claims benefit to Japanese Patent Application No. 2005-215922 filed Jul. 26, 2005. The above-noted applications are incorporated herein by reference in their entirety.

TECHNICAL FIELD

The present invention relates to a curable composition comprising a fluorine-containing elastomer having a cyano group in its trunk chain and/or side chain and inorganic nitride particles, or a curable composition comprising a specific crosslinking agent, a fluorine-containing elastomer having a cure site crosslinkable with the crosslinking agent, and inorganic nitride particles. The present invention also relates to a molded article obtained by curing the above-mentioned curable composition. The present invention further relates to a process for production of a molded article comprising a step of primary vulcanization of the curable composition and a step of secondary vulcanization following the primary vulcanization.

BACKGROUND ART

Fluorine-containing elastomers are molded into forms of an O-ring, a hose, a stem seal, a shaft seal and a diaphragm and are widely used in the fields of automobile industry, semiconductor industry and chemical industry because of their prominent heat resistance, chemical resistance, solvent resistance and fuel oil resistance.

However characteristics required therefor are becoming strict with progress of technology. In the fields of aeroplane and space, semiconductor manufacturing equipment, chemical plants and automobile industry, sealing property under higher temperature environment of more than 200° C. is demanded, and it is difficult to cope with such requirements in the cases of molded articles and sealing materials obtained by conventional methods of peroxide crosslinking and polyol crosslinking.

In the light of the mentioned problems, attempts to enhance characteristics required under high temperature environment by devising a crosslinking system have been proposed. For example, a curable composition comprising a perfluoro elastomer having a cyano group at its end and a nitrogen-containing nucleophilic compound and further a curable composition comprising an organotin compound as a curing agent (for example, cf. JP2004-500459A) are known. However in the case of the former composition, there is concern about toxicity and stimulant odor of a curing agent, and there is a problem with coloration of a molded article. In the case of the latter composition, there is a problem that tin used as a catalyst for triazine crosslinking has high toxicity.

In addition, a method of curing a perfluoro elastomer having a cyano group by exposing it to ammonia for a sufficient period of time (for example, cf. JP2003-531222A) is known. However this method has a problem that since the elastomer is exposed to ammonia being in the form of gas, it is difficult to uniformly cure a thick molded article stably.

DISCLOSURE OF INVENTION

The present invention provides a curable composition comprising a fluorine-containing elastomer having a cyano group in its trunk chain and/or side chain and inorganic nitride particles, or a curable composition comprising a specific crosslinking agent, a fluorine-containing elastomer having a cure site crosslinkable with the crosslinking agent, and inorganic nitride particles. The present invention also provides a molded article obtained by curing the above-mentioned curable composition. The present invention further provides a process for production of a molded article comprising a step of primary vulcanization of the curable composition and a step of secondary vulcanization following the primary vulcanization.

Namely, the present invention relates to a curable composition characterized by comprising a fluorine-containing elastomer having a cyano group in its trunk chain and/or side chain and inorganic nitride particles, and the inorganic nitride particles are contained in an amount of 0.1 to 20 parts by weight based on 100 parts by weight of the fluorine-containing elastomer.

In addition, the present invention relates to a curable composition comprising at least one kind of a crosslinking agent selected from the group consisting of an oxazole crosslinking agent, an imidazole crosslinking agent and a thiazole crosslinking agent, a fluorine-containing elastomer having a cure site crosslinkable with the crosslinking agent, and inorganic nitride particles.

It is preferable that the crosslinking agent is at least one compound selected from the group consisting of a compound having at least two crosslinkable reaction groups represented by the general formula (1):

wherein $R^1$s are the same or different and each is —$NH_2$, —$NHR^2$, —OH or —SH; $R^2$ is a fluorine atom or a monovalent organic group, a compound represented by the general formula (2):

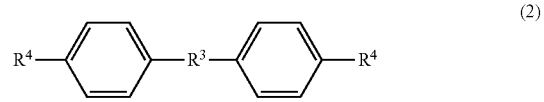

wherein $R^3$ is —$SO_2$—, —O—, —CO—, an alkylene group having 1 to 6 carbon atoms, a perfluoroalkylene group having 1 to 10 carbon atoms or a single bond; $R^4$ is

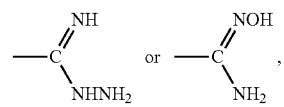

a compound represented by the general formula (3):

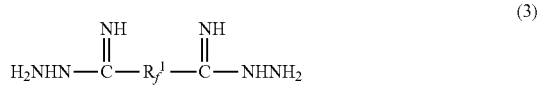

(3)

wherein $R_f^1$ is a perfluoroalkylene group having 1 to 10 carbon atoms, and a compound represented by the general formula (4):

(4)

wherein n is an integer of 1 to 10.

It is preferable that the inorganic nitride particles are silicon nitride particles.

The present invention further relates to a process for production of a molded article comprising a step of primary vulcanization of the curable composition and a step of secondary vulcanization following the primary vulcanization.

The process for production of a molded article of claim 5, wherein a primary vulcanization temperature is 150° to 200° C. and a secondary vulcanization temperature is 250° to 320° C.

Further the present invention relates to a molded article obtained by curing the above-mentioned curable composition.

BEST MODE FOR CARRYING OUT THE INVENTION

The present invention relates to the curable composition characterized by comprising a fluorine-containing elastomer having a cyano group in its trunk chain and/or side chain and inorganic nitride particles and the inorganic nitride particles are contained in an amount of 0.1 to 20 parts by weight based on 100 parts by weight of the fluorine-containing elastomer.

The fluorine-containing elastomer used in the present invention is not limited particularly as far as it has a cyano group (—CN group) in its trunk chain and/or side chain.

In the fluorine-containing elastomer used in the present invention, by action of the contained inorganic nitride particles, the cyano group forms a triazine ring by cyclization and trimerization to enable crosslinking of the elastomer, thereby imparting satisfactory compression set and heat resistance to the molded article.

Examples of the fluorine-containing elastomer are, for instance, perfluoro fluorine-containing rubbers and non-perfluoro fluorine-containing rubbers. The perfluoro fluorine-containing rubber is one comprising not less than 90% by mole of perfluoro monomers in its component units.

Example of the perfluoro fluorine-containing rubber is one comprising tetrafluoroethylene, perfluoro(alkyl vinyl ether) and a monomer giving a cure site. A proportion of tetrafluoroethylene/perfluoro(alkyl vinyl ether) is preferably 50 to 90/10 to 50% by mole, more preferably 50 to 80/20 to 50% by mole, further preferably 55 to 75/25 to 45% by mole. An amount of the monomer giving a cure site is preferably 0.1 to 5% by mole, more preferably 0.3 to 3% by mole based on the total amount of tetrafluoroethylene and perfluoro(alkyl vinyl ether) from the viewpoint of satisfactory crosslinking characteristics and heat resistance.

Examples of the perfluoro(alkyl vinyl ether) are, for instance, perfluoro(methyl vinyl ether), perfluoro(propyl vinyl ether) and the like. These can be used alone or can be used in optional combination.

Examples of the monomer giving a cure site are monomers represented by the general formulas (5) to (21):

 (5)

wherein $Y^1$ is a hydrogen atom or a fluorine atom, and n is an integer of 1 to 8,

 (6)

wherein $R_f^2$ is $-\!(\!OCF_2\!)\!-$ or $-\!(\!OCF(CF_3)\!)\!-$ and n is an integer of 0 to 5,

 (7)

wherein m is an integer of 0 to 5, and n is an integer of 0 to 5,

 (8)

wherein m is an integer of 0 to 5, and n is an integer of 0 to 5,

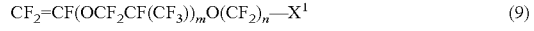 (9)

wherein m is an integer of 0 to 5, and n is an integer of 1 to 8),

 (10)

wherein m is an integer of 1 to 5,

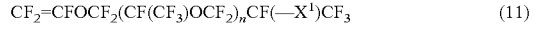 (11)

wherein n is an integer of 1 to 4,

 (12)

wherein n is an integer of 2 to 5,

 (13)

wherein n is an integer of 1 to 6,

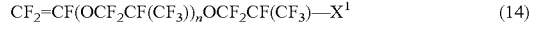 (14)

wherein n is an integer of 1 to 2,

 (15)

wherein n is an integer of 0 to 5,

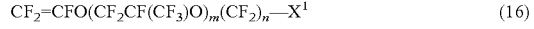 (16)

wherein m is an integer of 0 to 5, and n is an integer of 1 to 3,

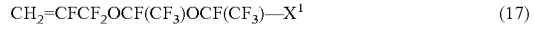 (17)

 (18)

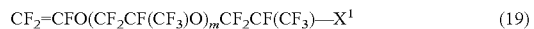 (19)

wherein m is an integer of 0 or more,

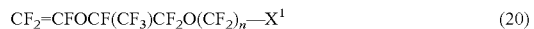 (20)

wherein n is an integer of at least 1,

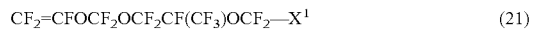 (21)

and in the general formulas (5) to (21), $X^1$ is a cyano group (—CN group). These monomers can be used alone or can be used in optional combination.

Among the above monomers, the general formula (9) or (16) is preferable, and $CF_2=CFOCF_2CF(CF_3OCF_2CF_2CN$ is more preferable.

Since the monomers represented by the general formulas (5) to (21) have a cyano group, the cyano group undergoes cyclization and trimerization reaction and thus triazine crosslinking proceeds.

These perfluoro fluorine-containing rubbers can be prepared by a usual method.

Examples of such a perfluoro fluorine-containing rubber are fluorine-containing rubbers disclosed in WO97/24381, JP61-57324B, JP4-816088 and JP5-13961B.

Examples of the non-perfluoro fluorine-containing rubbers are a fluorine-containing vinylidene fluoride (VdF) rubber, a fluorine-containing tetrafluoroethylene (TFE)/propylene rubber, a fluorine-containing tetrafluoroethylene (TFE)/propylene/vinylidene fluoride (VdF) rubber, a fluorine-containing ethylene/hexafluoropropylene (HFP) rubber, a fluorine-containing ethylene/hexafluoropropylene (HFP)/vinylidene fluoride (VdF) rubber, a fluorine-containing ethylene/hexafluoropropylene (HFP)/tetrafluoroethylene (TFE) rubber, a fluorine-containing fluorosilicone rubber and a fluorine-containing fluoro phosphazene rubber. These can be used alone or can be used in optional combination to an extent not to impair the effect of the present invention.

The fluorine-containing vinylidene fluoride rubber is a fluorine-containing copolymer comprising 45 to 85% by mole of vinylidene fluoride and 55 to 15% by mole of at least one kind of other monomer copolymerizable with the vinylidene fluoride, preferably a fluorine-containing copolymer comprising 50 to 80% by mole of vinylidene fluoride and 50 to 20% by mole of at least one kind of other monomer copolymerizable with the vinylidene fluoride.

Examples of at least one kind of other monomer copolymerizable with vinylidene fluoride are, for instance, fluorine-containing monomers such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro(alkyl vinyl ether) (PAVE) and vinyl fluoride, and non-fluorine-containing monomers such as ethylene, propylene and alkyl vinyl ether. These can be used alone or can be used in optional combination. Among them, tetrafluoroethylene, hexafluoropropylene and perfluoro(alkyl vinyl ether) are preferable.

Examples of the rubbers are a VdF-HFP rubber, a VdF-HFP-TFE rubber, a VdF-CTFE rubber, a VdF-CTFE-TFE rubber and the like.

The fluorine-containing tetrafluoroethylene/propylene rubber is a fluorine-containing copolymer comprising 45 to 70% by mole of tetrafluoroethylene, 55 to 30% by mole of propylene and further 0 to 5% by mole of a monomer giving a cure site based on the total amount of tetrafluoroethylene and propylene.

Examples of the monomer giving a cure site are cyano group-containing monomers disclosed in JP4-505345A and JP5-500070A and the monomers represented by the above-mentioned general formulas (5) to (21).

These non-perfluoro fluorine-containing rubbers can be prepared by a usual method.

In addition, a thermoplastic fluorine-containing rubber comprising an elastomeric fluorine-containing polymer chain segment and a non-elastomeric fluorine-containing polymer chain segment may be used as the fluorine-containing elastomer, and a rubber composition comprising the above-mentioned fluorine-containing rubber and a thermoplastic fluorine-containing rubber may also be used.

For separating a polymerization product from a polymerization reaction mixture, a method of coagulation by acid treatment is preferable for simplification of a process. Or there may be employed a method of subjecting a polymerization mixture to acid treatment and thereafter separating a polymerization product by means of freeze-drying or the like. Further there can be employed a method of coagulation with ultrasonic wave or coagulation by a mechanical force.

Further for introducing a cyano group, the method disclosed in WO00/05959 can be used.

The curable composition of the present invention contains inorganic nitride particles. The inorganic nitride particles are not limited particularly, and examples thereof are silicon nitride ($Si_3N_4$), lithium nitride, titanium nitride, aluminum nitride, boron nitride, vanadium nitride, zirconium nitride and the like. Among them, silicon nitride particles are preferable since fine particles of nano size are available and the particles do not contain metals causing any damage in a semiconductor manufacturing process. In addition, a mixture of two or more kinds of these nitride particles may be used.

A particle size of the inorganic nitride particles is not limited particularly, and is preferably not more than 1,000 nm, more preferably not more than 300 nm, further preferably not more than 100 nm. A lower limit thereof is not limited particularly.

In the present invention, by the presence of the inorganic nitride particles, the cyano group in the fluorine-containing elastomer undergoes cyclization and trimerization reaction and thereby a triazine crosslinking reaction proceeds.

An amount of the inorganic nitride particles is 0.1 to 20 parts by weight, preferably 0.2 to 5 parts by weight, more preferably 0.2 to 1 part by weight based on 100 parts by weight of the fluorine-containing elastomer. When the amount of the inorganic nitride particles is less than 0.1 part by weight, since a vulcanization density is decreased, there is a tendency that sufficient heat resistance and chemical resistance are not exhibited from practical point of view. When the amount of the inorganic nitride particles exceeds 20 parts by weight, there is a fear of causing scorching and there is a problem that storage stability is lowered, and transparency of color of the molded article tends to be lost.

Also the present invention relates to a curable composition comprising at least one kind of a crosslinking agent selected from the group consisting of an oxazole crosslinking agent, an imidazole crosslinking agent and a thiazole crosslinking agent, a fluorine-containing elastomer having a cure site crosslinkable with the crosslinking agent and inorganic nitride particles.

Preferable example of an oxazole crosslinking agent, an imidazole crosslinking agent or a thiazole crosslinking agent is at least one compound selected from the group consisting of a compound having at least two crosslinkable reaction groups represented by the general formula (1):

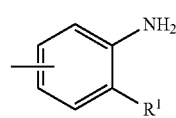
(1)

wherein $R^1$s are the same or different and each is $-NH_2$, $-NHR^2$, $-OH$ or $-SH$; $R^2$ is a fluorine atom or a monovalent organic group, a compound represented by the general formula (2):

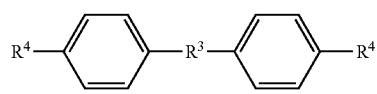
(2)

wherein $R^3$ is —$SO_2$—, —O—, —CO—, an alkylene group having 1 to 6 carbon atoms, a perfluoroalkylene group having 1 to 10 carbon atoms or a single bond; $R^4$ is

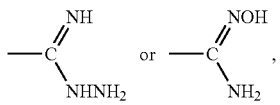

a compound represented by the general formula (3):

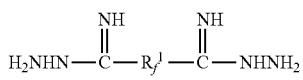

(3)

wherein $R_f^1$ is a perfluoroalkylene group having 1 to 10 carbon atoms, and a compound represented by the general formula (4):

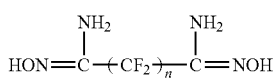

(4)

wherein n is an integer of 1 to 10, from the viewpoint of heat resistance.

An oxazole ring, an imidazole ring and a thiazole ring can be formed by a reaction of these crosslinking agents with a cure site of the fluorine-containing elastomer. Among these crosslinking agents, a crosslinking agent being capable of forming an imidazole ring is preferable from the viewpoint of capability of providing a crosslinked article having excellent mechanical strength, heat resistance, chemical resistance and cold resistance, particularly one having well-balanced heat resistance and cold resistance.

Among them, preferable is the compound having at least two crosslinkable reaction groups represented by the general formula (1) because the structure of a crosslinked article is stabilized by the aromatic ring, thereby enhancing heat resistance.

The compound having at least two crosslinkable reaction groups represented by the general formula (1) has preferably 2 to 3 crosslinkable reaction groups, more preferably 2 crosslinkable reaction groups. When the number of crosslinkable reaction groups represented by the general formula (1) is less than 2, the elastomer cannot be crosslinked.

The substituent $R^2$ in the crosslinkable reaction groups represented by the general formula (1) is a monovalent organic group other than a hydrogen atom, or a fluorine atom. Since a N—$R^2$ bond has higher oxidation resistance than a N—H bond, the N—$R^2$ bond is preferable.

The monovalent organic group is not particularly limited, and examples thereof are an aliphatic hydrocarbon group, phenyl group, and benzyl group. Specifically, at least one of $R^2$s is a lower alkyl group having 1 to 10 carbon atoms, particularly 1 to 6 carbon atoms such as —$CH_3$, —$C_2H_5$, or —$C_3H_7$; a fluorine atom-containing lower alkyl group having 1 to 10 carbon atoms, particularly 1 to 6 carbon atoms such as —$CF_3$, —$C_2F_5$, —$CH_2F$, —$CH_2CF_3$, or —$CH_2C_2F_5$; phenyl group; benzyl group; phenyl group or benzyl group, in which 1 to 5 hydrogen atoms are replaced by fluorine atoms, such as —$C_6F_5$ or —$CH_2C_6F_5$; phenyl group or benzyl group, in which 1 to 5 hydrogen atoms are replaced by —$CF_3$, such as —$C_6H_{5-n}(CF_3)_n$ or —$CH_2C_6H_{5-n}(CF_3)_n$ (n is an integer of 1 to 5).

Among these, phenyl group and —$CH_3$ are preferable from the viewpoint that heat resistance is particularly excellent, crosslinking reactivity is good, and further, synthesis is relatively easy.

Compounds which have two crosslinkable reactive groups represented by the general formula (1) and are represented by the general formula (22):

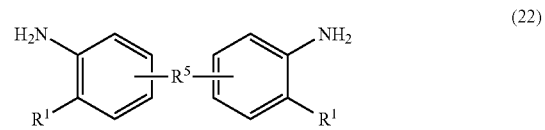

(22)

wherein $R^1$s are the same as defined above; $R^5$ is —$SO_2$—, —O—, —CO—, an alkylene group having 1 to 6 carbon atoms, a perfluoroalkylene group having 1 to 10 carbon atoms, a single bond, or a group represented by:

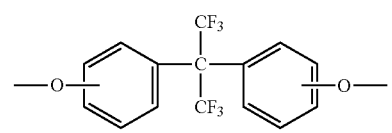

are preferable as the crosslinking agent, from the viewpoint of easiness in synthesis.

Preferable examples of an alkylene group having 1 to 6 carbon atoms are a methylene group, an ethylene group, a propylene group, a butylene group, a pentylene group, and a hexylene group, and an example of a perfluoroalkylene group having 1 to 10 carbon atoms is

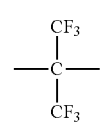

These compounds are known as the examples of bisdiaminophenyl compounds in JP2-59177B and JP8-120146A.

Among these, more preferable compounds are compounds represented by the general formula (23):

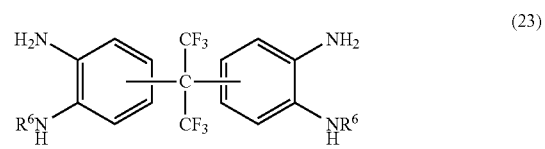

(23)

wherein $R^6$s are the same or different, and each is a hydrogen atom, an alkyl group having 1 to 10 carbon atoms; a fluorine atom-containing alkyl group having 1 to 10 carbon atoms; phenyl group; benzyl group; phenyl group or benzyl group, in which 1 to 5 hydrogen atoms are replaced by fluorine atoms and/or —$CF_3$.

Nonlimiting examples thereof are 2,2-bis(3,4-diaminophenyl) hexafluoropropane, 2,2-bis[3-amino-4-(N-methylamino)phenyl]hexafluoropropane, 2,2-bis[3-amino-4-(N- ethylamino)phenyl]hexafluoropropane, 2,2-bis[3-amino-4-(N-propylamino)phenyl]hexafluoropropane, 2,2-bis[3-amino-4-(N-phenylamino)phenyl]hexafluoropropane, 2,2-bis[3-amino-4-(N-perfluorophenylamino)phenyl]hexafluoropropane, and 2,2-bis[3-amino-4-(N-benzylamino)phenyl]hexafluoropropane. Among these, from the viewpoint that heat resistance is excellent, and crosslinking reactivity is particularly excellent, 2,2-bis(3,4-diaminophenyl)hexafluoropropane and 2,2-bis[3-amino-4-(N-phenylamino)phenyl]hexafluoropropane are further preferable.

Such a bisamidoxime crosslinking agent, a bisamidrazone crosslinking agent, a bisaminophenol crosslinking agent, a bisaminothiophenol crosslinking agent or a bisdiaminophenyl crosslinking agent reacts with a cyano group, a carboxyl group and an alkoxycarbonyl group contained in the fluorine-containing elastomer to form an oxazole ring, a thiazole ring or an imidazole ring, thereby giving a crosslinked product.

Also in the present invention, a catalyst for triazine crosslinking can be used in combination. Examples of the catalyst for triazine crosslinking are organotin compounds such as tetraphenyltin and triphenyltin.

An amount of the crosslinking agent and/or catalyst for triazine crosslinking is preferably 0.1 to 20 parts by weight, more preferably 0.3 to 10 parts by weight based on 100 parts by weight of the fluorine-containing elastomer. When the amount of the crosslinking agent and/or catalyst for triazine crosslinking is less than 0.1 part by weight, there is a tendency that mechanical strength, heat resistance and chemical resistance sufficient for practical use cannot be obtained, and when exceeding 20 parts by weight, it takes much time for crosslinking and a crosslinked product becomes hard and is free from flexibility. Also there is a tendency that uneven crosslinking occurs and heat resistance and chemical resistance are deteriorated.

The fluorine-containing elastomer is not limited particularly as far as it has a cure site being capable of crosslinking reaction with at least one kind of a crosslinking agent selected from the group consisting of an oxazole crosslinking agent, an imidazole crosslinking agent and a thiazole crosslinking agent.

Examples of the cure site being capable of crosslinking reaction are a cyano group, a carboxyl group and an alkoxycarbonyl group. By the reaction of the cure site with the above-mentioned crosslinking agent, an oxazole ring, an imidazole ring or a thiazole ring can be formed.

Examples of the fluorine-containing elastomer are perfluoro fluorine-containing rubbers and non-perfluoro fluorine-containing rubbers. The perfluoro fluorine-containing rubber is one comprising not less than 90% by mole of perfluoro monomers in its component units.

Examples of the perfluoro fluorine-containing rubbers are those comprising tetrafluoroethylene/perfluoro(alkyl vinyl ether)/a monomer giving a cure site. A proportion of tetrafluoroethylene/perfluoro(alkyl vinyl ether) is preferably 50 to 90/10 to 50% by mole, more preferably 50 to 80/20 to 50% by mole, further preferably 55 to 70/30 to 45% by mole. An amount of the monomer giving a cure site is preferably 0 to 5% by mole, more preferably 0 to 2% by mole based on the total amount of tetrafluoroethylene and perfluoro(alkyl vinyl ether). When the proportions of these components are beyond the above-mentioned ranges, there is a tendency that properties of elastic rubber are lost and properties of the rubber become akin to those of a resin.

Examples of the perfluoro(alkyl vinyl ether) are, for instance, perfluoro(methyl vinyl ether), perfluoro(propyl vinyl ether) and the like. Those can be used alone or can be used in optional combination.

Examples of the monomer giving a cure site are those represented by the above-mentioned general formulas (5) to (21). In these formulas, $X^1$ may be a cyano group (—CN group), a carboxyl group (—COOH group) or an alkoxycarbonyl group (—COOR$^7$ group, where $R^7$ is an alkyl group having 1 to 10 carbon atoms which may have fluorine atom).

These perfluoro fluorine-containing rubbers can be prepared by a usual method.

Examples of such a perfluoro fluorine-containing rubber are the same as those raised supra.

Also the same examples as mentioned above can be raised as the examples of the non-perfluoro fluorine-containing rubber. When a monomer giving a cure site is contained in the non-perfluoro fluorine-containing rubber, examples thereof are cyano group-containing monomers, carboxyl group-containing monomers and alkoxycarbonyl group-containing monomers described in JP5-500070A, and monomers represented by the above-mentioned general formulas (5) to (21), in which $X^1$ is a cyano group (—CN group), a carboxyl group (—COOH group) or an alkoxycarbonyl group (—COOR$^7$ group, where $R^7$ is an alkyl group having 1 to 10 carbon atoms which may have fluorine atom).

These non-perfluoro fluorine-containing rubbers can be prepared by a usual method.

In addition, a thermoplastic fluorine-containing rubber comprising an elastomeric fluorine-containing polymer chain segment and a non-elastomeric fluorine-containing polymer chain segment may be used as the fluorine-containing elastomer, and a rubber composition comprising the above-mentioned fluorine-containing rubber and a thermoplastic fluorine-containing rubber may also be used.

For separating a polymerization product from a polymerization reaction mixture, a method of coagulation by acid treatment is preferable for simplification of a process. Or there may be employed a method of subjecting a polymerization mixture to acid treatment and thereafter separating a polymerization product by means of freeze-drying or the like. Further there can be employed a method of coagulation with ultrasonic wave or coagulation by a mechanical force.

In the fluorine-containing elastomer of the present invention, by acid treatment of a polymerization product, groups contained in the polymerization product such as a metallic salt and an ammonium salt of carboxylic acid can be converted to carboxyl groups. For the acid treatment, a method of washing with hydrochloric acid, sulfuric acid or nitric acid or a method of decreasing a pH value of the mixture system after the polymerization reaction to 3 or less with such an acid is suitable.

In addition, a carboxylic acid can be introduced by oxidizing a crosslinkable elastomer containing iodine or bromine with fuming nitric acid.

Also the method described in WO00/05959 can be used as a method of introducing a cyano group, a carboxylic group or an alkoxycarbonyl group.

Examples of the inorganic nitride particles are those exemplified supra.

An amount of the inorganic nitride particles is 0.01 to 1 part by weight based on 100 parts by weight of the fluorine-containing elastomer. A lower limit thereof is preferably 0.03 part by weight, more preferably 0.05 part by weight, and an upper limit is preferably 0.7 part by weight, more preferably 0.5 part by weight.

In the above-mentioned two embodiments of the curable composition, in the fields where especially high purity and non-staining property are not required, usual additives to be blended to a curable composition according to necessity, for example, a filler, a processing auxiliary, a plasticizer, a colorant, a stabilizer and an adhesion auxiliary can be blended to the composition, and in addition, one or more of usual crosslinking agents and crosslinking aids which differ from those mentioned above may be blended.

The present invention further relates to a process for production of a molded article comprising a step of primary vulcanization of the curable composition and a step of secondary vulcanization following the primary vulcanization.

The curable composition can be prepared by mixing the above-mentioned components with a usual elastomer processing equipment, for example, an open roll, a Banbury mixer or a kneader. In addition, the composition can be prepared also by a method of using a closed mixer.

For producing a pre-molded article from the above-mentioned composition, usual known methods may be employed, such as a method of heating and compressing the composition in a die, or a method of putting the composition in a heated die under pressure, and a method of extruding with an extruder, and thereafter, carrying out primary vulcanization and secondary vulcanization in this order. Thus a molded article can be obtained.

It is preferable to carry out the primary vulcanization at 150° to 200° C. for 5 to 120 minutes, more preferably at 170° to 190° C. for 5 to 60 minutes. For the vulcanization, known vulcanization means, for example, press vulcanization may be employed.

It is preferable that the secondary vulcanization is carried out at 250° to 320° C. for 2 to 24 hours, more preferably at 280° to 310° C. for 5 to 20 hours. For the vulcanization, known vulcanization means, for example, oven vulcanization may be employed.

The molded article of the present invention can be obtained by crosslinking and molding the curable composition of the present invention. The molded article of the present invention is excellent in compression set.

The molded article of the present invention is useful as various molded articles in a variety of fields as raised below.

In the semiconductor-related fields such as semiconductor manufacturing equipment, liquid crystal panel manufacturing apparatuses, plasma panel manufacturing apparatuses, plasma addressed liquid crystal panels, field-emission display panels, and solar cell boards, there are raised O(square)-rings, packing, sealing materials, tubes, rolls, coating, lining, gaskets, diaphragms, hoses, and the like. And they can be used on CVD apparatuses, dry etching apparatuses, wet etching apparatuses, oxidation diffusion apparatuses, sputtering apparatuses, ashing apparatus, cleaning equipment, ion implantation systems, exhaust systems, chemicals piping, and gas piping. Specifically, they can be used as O-rings and sealing materials for gate valves, O-rings and sealing materials for quartz windows, O-rings and sealing materials for chambers, O-rings and sealing materials for gates, O-rings and sealing materials for bell jars, O-rings and sealing materials for couplings, O-rings, sealing materials and diaphragms for pumps, O-rings and sealing materials for gas controllers for semiconductors, O-rings and sealing materials for resist developers and resist strippers, hoses and tubes for wafer cleaning solution, rolls for conveying wafer, lining and coating for resist developer baths and resist stripper baths, lining and coating for wafer cleaning solution baths, or lining and coating for wet etching baths. Further, they are used for sealants and sealing agents, for covering materials of quartz in optical fibers, for potting, coating, and adhesive seals in electronic components and breadboards that have the purposes of electrical insulation, vibration control, waterproofing, and moisture-proofing, for gaskets for magnetic storages, for modifying agents of sealants such as epoxy resins, for sealants for clean rooms and clean equipment, and the like.

Further, they can be widely used in the fields of automobile, aircraft, rocket, marine vessel, chemical product plants, medicals such as pharmaceuticals, photograph such as developing machine, printing such as printing machine, painting such as painting equipment, analyzer and physical and chemical equipment, equipment in food factories, equipment in atomic power plants, iron and steel industry such as steel sheet processing equipment, general industry, electricity, fuel cells, electronic parts, and field molding.

EXAMPLES

Hereinafter, the present invention is explained based on examples, however, the present invention is not limited thereto.
Evaluation Method
<Compression Set>
A compression set of an O-ring (AS-568A-214) after left at 200° C., 250° C., 275° C. and 300° C. for 72 hours and 166 hours is measured according to JIS K6301.
(Standard vulcanization Conditions)
Kneading Method: Roll Kneading
Press vulcanization: 30 minutes at 180° C.
Oven vulcanization: 18 hours at 290° C.
<100% Modulus (M100)>
A curable composition shown in Table 1 is formed into a 2 mm thick sheet by primary press vulcanization and secondary oven vulcanization under the standard vulcanization conditions, and 100% modulus thereof is measured according to JIS-K6251.
<Tensile Strength at Break (Tb) and Tensile Elongation at Break (Eb)>
A curable composition shown in Table 1 is formed into a 2 mm thick sheet by primary press vulcanization and secondary oven vulcanization under the standard vulcanization conditions, and tensile strength at break (Tb) and tensile elongation at break (Eb) thereof are measured according to JIS-K6251.
<Vulcanization Properties>
A vulcanization curve at 180° C. is made in primary press vulcanization by using a JSR-type curastometer model II, and minimum viscosity (ML), vulcanization degree (MH), induction time (T10) and optimum vulcanization time (T90) are determined. Also evaluation is made with respect to whether or not scorching occurs.
<Shore A Hardness>
Shore A hardness is measured according to ASTM D2240. Specifically, the measurement is carried out with an analog hardness meter type A manufactured by KOBUNSHI KEIKI CO., LTD.

Preparation Example 1

A 6-liter stainless steel autoclave without an ignition source was charged with 2.3 liter of pure water, 23 g of

as an emulsifier, and 0.2 g of ammonium carbonate as a pH regulator. After the inside of a system was sufficiently replaced with a nitrogen gas to deaerate the system, an inside temperature was raised to 50° C. while stirring at 600 rpm, and tetrafluoroethylene (TFE) and perfluoro(methyl vinyl ether) (PMVE) were charged thereto at TFE/PMVE=24/76 (molar ratio) so that an inside pressure became 0.8 MPa. Then, 0.8 g of $CF_2=CFOCF_2CF(CF_3)OCF_2CF_2CN$ (CNVE)

was introduced by pressurized nitrogen. 10 ml of an aqueous solution of ammonium persulfate (APS) having a concentration of 1.2 g/ml was introduced by pressurized nitrogen and a reaction was initiated.

When the inside pressure was lowered to 0.7 MPa as polymerization proceeded, 12 g of TFE and 13 g of PMVE were introduced by their own pressure. Thereafter, as the reaction proceeded, TFE and PMVE were introduced in the same manner, and increase and decrease in pressure were repeated between 0.7 MPa and 0.9 MPa, and at the same time, 1.5 g of CNVE was introduced by pressurized nitrogen every time when an addition amount of TFE and PMVE reached 80 g.

When the total charging amount of TFE and PMVE reached 680 g, the autoclave was cooled and unreacted monomers were discharged to obtain 3,110 g of an aqueous dispersion having solid content of 22% by weight.

This 3,110 g of the aqueous dispersion was diluted with 3,730 g of water, and slowly added with stirring to 3,450 g of a nitric acid solution having a concentration of 4.8% by weight. After the solution was stirred for 30 minutes after the adding, coagulated substances were filtered, and the obtained polymer was washed with water and then subjected to vacuum drying to obtain 680 g of a fluorine-containing elastomer (A).

As a result of $^{19}$F-NMR analysis, the monomer unit composition of this polymer was found to be TFE/PMVE/CNVE=59.3/39.9/0.8 (% by mole). According to an infrared spectroscopic analysis, characteristic absorption of a carboxyl group was recognized at around 1,774.9 cm$^{-1}$ and 1,808.6 cm$^{-1}$, and characteristic absorption of an OH group was recognized at around 3,557.5 cm$^{-1}$ and 3,095.2 cm$^{-1}$.

Example 1

The fluorine-containing elastomer (A) having a cyano group at its terminal and obtained in Preparation Example 1 and silicon nitride ($Si_3N_4$, available from UBE INDUSTRIES, LTD., SN-A00, particle size: 30 nm) were mixed at a weight ratio of 100/0.2 and kneaded with an open roll to prepare a curable composition.

This elastomer composition was press-crosslinked (primary crosslinking) at 180° C. for a period of time corresponding to T90 and, then, oven-crosslinked (secondary crosslinking) at 290° C. for 18 hours to prepare an O-ring (AS-568A-214). In addition, a vulcanization curve of the composition at 180° C. was made by using a JSR-type curastometer model II (manufactured by JSR Trading Co., Ltd.), and minimum viscosity (ML), vulcanization degree (MH), induction time (T10) and optimum vulcanization time (T90) were determined. Further, compression set (200° C., 250° C. and 300° C., 72 hours), 100% modulus, tensile strength at break, tensile elongation at break and Shore A hardness were measured. Results thereof are shown in Table 1.

Examples 2 and 3

O-rings were produced in the same manner as in Example 1 except that the amount of silicon nitride was changed as shown in Table 1, and minimum viscosity (ML), vulcanization degree (MH), induction time (T10), optimum vulcanization time (T90), compression set (200° C., 250° C. and 300° C., 72 hours), 100% modulus, tensile strength at break, tensile elongation at break and Shore A hardness were measured. Results thereof are shown in Table 1.

Example 4

An O-ring was produced in the same manner as in Example 1 except that the fluorine-containing elastomer (A) having a cyano group at its terminal and obtained in Preparation Example 1 and silicon nitride ($Si_3N_4$, pulverized SN-E10 available from UBE INDUSTRIES, LTD., particle size: 300 nm or less) were mixed at a weight ratio of 100/20 and kneaded with an open roll to prepare a curable composition. Then, minimum viscosity (ML), vulcanization degree (MH), induction time (T10), optimum vulcanization time (T90), compression set (250° C., 72 hours), 100% modulus, tensile strength at break, tensile elongation at break and Shore A hardness were measured. Results thereof are shown in Table 1.

Example 5

An O-ring was produced in the same manner as in Example 1 except that the fluorine-containing elastomer (A) having a cyano group at its terminal and obtained in Preparation Example 1 and aluminum nitride (AlN available from TOKUYAMA CORPORATION, pulverized particles of H grade) were mixed at a weight ratio of 100/20 and kneaded with an open roll to prepare a curable composition. Then, minimum viscosity (ML), vulcanization degree (MH), induction time (T10), optimum vulcanization time (T90), compression set (250° C., 72 hours), 100% modulus, tensile strength at break, tensile elongation at break and Shore A hardness were measured. Results thereof are shown in Table 1.

TABLE 1

| | | Example | | | | |
|---|---|---|---|---|---|---|
| | | 1 | 2 | 3 | 4 | 5 |
| Composition (part by weight) | Fluorine-containing elastomer (A) | 100 | 100 | 100 | 100 | 100 |
| | $Si_3N_4$ (particle size: 30 nm) | 0.20 | 0.35 | 0.40 | 0 | 0 |
| | $Si_3N_4$ (particle size: ≤300 nm) | 0 | 0 | 0 | 20 | 0 |
| | ALN (pulverized product) | 0 | 0 | 0 | 0 | 20 |
| Results of evaluation | | | | | | |
| Vulcanizability 180° C. model II | MH (kgf) | 2.75 | 3.77 | 4.26 | 1.7 | 2.0 |
| | ML (kgf) | 0.70 | 0.75 | 0.80 | 0.6 | 0.7 |
| | T10 (min) | 0.9 | 0.8 | 0.5 | 4 | 4 |
| | T90 (min) | 18.0 | 17.5 | 21.0 | 45 | 40 |
| Physical properties under normal conditions | M100 (kgf/cm$^2$) | — | 12 | 14 | 51 | 50 |
| | Tb (kgf/cm$^2$) | — | 95 | 102 | 130 | 120 |
| | Eb (%) | — | 295 | 265 | 180 | 170 |
| | Shore A | — | 57.2 | 58 | 76 | 78 |
| Compression set (%) | 300° C. × 72 hr | — | 33 | 30 | — | — |
| | 250° C. × 72 hr | — | 18 | 17 | 42 | 48 |
| | 200° C. × 72 hr | — | 18 | 17 | — | — |

Examples 6 and 7

The fluorine-containing elastomer (A) having a cyano group at its terminal and obtained in Preparation Example 1, 2,2-bis[3-amino-4-(N-phenylamino)phenyl]hexafluoropropane (AFTA-Ph) and silicon nitride ($Si_3N_4$, available from UBE INDUSTRIES, LTD., SN-A00, particle size: 30 nm) were mixed at a weight ratio of 100/1.2/0.1, and thereto was blended polyimide (UIP-S available from UBE INDUSTRIES, LTD.) or silica ($SiO_2$ available from Cabot Specialty Chemicals Inc., M-7D) as a filler, followed by kneading with an open roll to prepare a curable composition.

This elastomer composition was press-crosslinked (primary crosslinking) at 180° C. for a period of time corresponding to T90 and, then, oven-crosslinked (secondary crosslinking) at 290° C. for 18 hours to prepare an O-ring (AS-568A-214). In addition, a vulcanization curve of the composition at 180° C. was made by using a JSR-type curastometer model II (manufactured by JSR Trading Co., Ltd.), and minimum viscosity (ML), vulcanization degree (MH), induction time (T10) and optimum vulcanization time (T90) were determined. Further, compression set (275° C. and 300° C., 72 hours and 168 hours), 100% modulus, tensile strength at break, tensile elongation at break and Shore A hardness were measured. Results thereof are shown in Table 2.

Example 8

An O-ring was produced in the same manner as in Example 6 except that the fluorine-containing elastomer (A) having a cyano group at its terminal and obtained in Preparation Example 1, 2,2-bis[3-amino-4-(N-phenylamino)phenyl]hexafluoropropane (AFTA-Ph) and silicon nitride ($Si_3N_4$, available from UBE INDUSTRIES, LTD., SN-E10, particle size: 300 nm or less) were mixed at a weight ratio of 100/1.0/5, and thereto was blended carbon (Thermax N990 available from Cancarb Limited.) as a filler, followed by kneading with an open roll to prepare a curable composition. Then, minimum viscosity (ML), vulcanization degree (MH), induction time (T10), optimum vulcanization time (T90), compression set (275° C. and 300° C., 72 hours and 168 hours), 100% modulus, tensile strength at break, tensile elongation at break and Shore A hardness were measured. Results thereof are shown in Table 2.

Comparative Examples 1 to 3

O-rings were produced in the same manner as in Examples 6, 7 and 8 except that silicon nitride was not used, and minimum viscosity (ML), vulcanization degree (MH), induction time (T10), optimum vulcanization time (T90), compression set (275° C. and 300° C., 72 hours and 168 hours), 100% modulus, tensile strength at break, tensile elongation at break and Shore A hardness were measured. Results thereof are shown in Table 2.

TABLE 2

| | | Ex. 6 | Com. Ex. 1 | Ex. 7 | Com. Ex. 2 | Ex. 8 | Com. Ex. 3 |
|---|---|---|---|---|---|---|---|
| Composition (part by weight) | Fluorine-containing elastomer (A) | 100 | 100 | 100 | 100 | 100 | 100 |
| | Crosslinking agent | 1.2 | 1.2 | 1.2 | 1.2 | 1.0 | 1.0 |
| | Polyimide | 15 | 15 | 0 | 0 | 0 | 0 |
| | $SiO_2$ | 0 | 0 | 10 | 10 | 0 | 0 |
| | Carbon | 0 | 0 | 0 | 0 | 20 | 20 |
| | $Si_3N_4$ (particle size: 30 nm) | 0.1 | 0 | 0.1 | 0 | 0 | 0 |
| | $Si_3N_4$ (particle size: 300 nm) | 0 | 0 | 0 | 0 | 5 | 0 |
| Results of evaluation | | | | | | | |
| Vulcanizability 180° C. model II | MH (kgf) | 4.10 | 2.76 | 3.40 | 2.55 | 3.8 | 3.5 |
| | ML (kgf) | 0.66 | 0.57 | 1.08 | 1.22 | 0.8 | 0.7 |
| | T10 (min) | 1.5 | 11.0 | 1.9 | 15.0 | 3 | 6 |
| | T90 (min) | 7.6 | 62.0 | 9.2 | >100.0 | 12 | 17 |
| Physical properties under normal conditions | M100 (kgf/cm$^2$) | 53 | 50 | 51 | 52 | 65 | 60 |
| | Tb (kgf/cm$^2$) | 133 | 131 | 180 | 174 | 190 | 230 |
| | Eb (%) | 234 | 256 | 310 | 288 | 205 | 200 |
| | Shore A | 73 | 73 | 77 | 75 | 83 | 73 |
| Compression set (%) | 275° C. × 72 hr | 10 | 18 | 43 | 58 | 22 | 22 |
| | 275° C. × 168 hr | 14 | 26 | 50 | 67 | 25 | 25 |
| | 300° C. × 72 hr | 24 | 31 | 53 | 72 | 32 | 30 |
| | 300° C. × 168 hr | 35 | 44 | 71 | 88 | 39 | 38 |

INDUSTRIAL APPLICABILITY

In the first curable composition of the present invention, since the fluorine-containing elastomer having a cyano group in its trunk chain and/or side chain can be cured without adding a curing agent, there can be provided a molded article exhibiting less coloration and having excellent compression set and heat resistance. Further in the second curable composition of the present invention, since the inorganic nitride particles act as a co-curing agent or a curing accelerator, a vulcanization time can be shortened and a molded article having excellent compression set can be provided. In addition, a process for production of a molded article comprising a step of primary vulcanization of the curable composition of the present invention and a step of secondary vulcanization following the primary vulcanization can be provided.

The invention claimed is:
1. A molded article obtained by crosslinking and molding a curable composition characterized by comprising a fluorine-containing elastomer having a cyano group in its trunk chain and/or side chain and silicon nitride particles,
   wherein crosslinking of the fluorine-containing elastomer proceeds via a triazine crosslinking reaction by action of the silicon nitride particles where the cyano group forms a triazine ring by cyclization and trimerization,
   wherein the silicon nitride particles are contained in an amount of 0.1 to 20 parts by weight based on 100 parts by weight of the fluorine-containing elastomer,
   wherein the composition is curable without adding a curing agent to the curable composition and does not comprise a curing agent, and a particle size of the silicon nitride particles is not more than 100 nm.

2. A method of producing a molded article comprising:
crosslinking and molding a curable composition characterized by comprising a fluorine-containing elastomer having a cyano group in its trunk chain and/or side chain and silicon nitride particles, in which crosslinking of the fluorine-containing elastomer proceeds via a triazine crosslinking reaction by action of the silicon nitride particles where the cyano group forms a triazine ring by cyclization and trimerization,
wherein the silicon nitride particles are contained in an amount of 0.1 to 20 parts by weight based on 100 parts by weight of the fluorine-containing elastomer,
wherein the composition is curable without adding a curing agent to the curable composition and does not comprise a curing agent, and a particle size of the silicon nitride particles is not more than 100 nm.

* * * * *